April 2, 1957 C. H. SPITLER 2,787,388
POWER OPERATED TAIL GATE ASSEMBLY
Filed April 28, 1955 2 Sheets-Sheet 1

INVENTOR.
CLEM H. SPITLER
BY
Tom Walker

April 2, 1957 C. H. SPITLER 2,787,388
POWER OPERATED TAIL GATE ASSEMBLY
Filed April 28, 1955 2 Sheets-Sheet 2

INVENTOR.
CLEM H. SPITLER
BY Tom Walker

United States Patent Office — 2,787,388 — Patented Apr. 2, 1957

2,787,388

POWER OPERATED TAIL GATE ASSEMBLY

Clem H. Spitler, Dayton, Ohio, assignor, by mesne assignments, to Curtis Automotive Devices, Inc., Bedford, Ind., a corporation of Ohio Application April 28, 1955, Serial No. 504,594

7 Claims. (Cl. 214—75)

This invention relates to tail gate hoists for trucks, and more particularly to a novel construction and arrangement of parts for controlling the movable platform assembly, comprising the tail gate proper.

While power operated tail gate assemblies or hoists of the general type shown herein have heretofore been known (United States patent to French, No. 2,701,656, issued February 8, 1955) various changes and modifications of such hoists have been found desirable. The present invention is concerned primarily with improvements in tail gate assemblies of this general type so as to over-come the disadvantages and weaknesses inherent therein from the standpoint of both manufacturing and use.

The object of the invention is to simplify the construction as well as the means and mode of operation of tail gate assemblies, whereby such assemblies may not only be economically manufactured, but will be more efficient and satisfactory in use, adaptable to a wide variety of applications, and be unlikely to get out of order.

A further object of the invention is to present a tail gate hoist assembly of such unitary character that it may be readily installed on existing trucks without modification in the body thereof.

Another object of the invention is to enable the unitary tail gate assembly to be mounted on the chassis of the truck.

A further object of the invention is to provide a simplified elevating mechanism for the platform gate, having especial regard to a centering and steadying of the platform during relative swinging motion of supporting arms.

Still another object of the invention is to introduce a generally new concept in tail gate hoist assemblies applicable with little change to trucks of the pick-up type (one-half, three-quarter and one ton) and to larger trucks where the floor is raised above the wheels.

A still further object of the invention is to enable the tail gate to be locked in elevated position independently of the elevating mechanism.

A further object of the invention is to provide a power operated tail gate assembly or hoist possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a fragmentary view in perspective of the rear of a pick-up truck or the like, showing a tail gate hoist assembly installed thereon, the tail gate being in lowered position;

Figure 4:
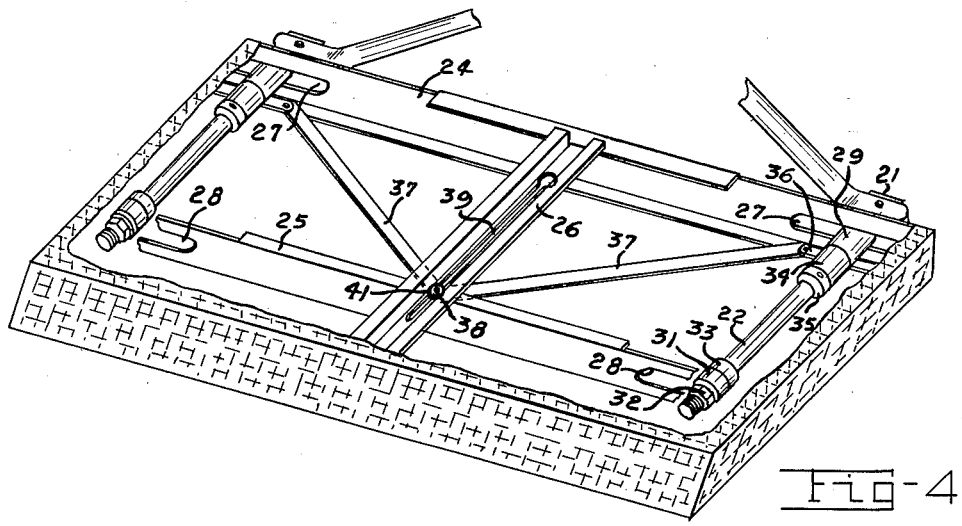
Figure 5:
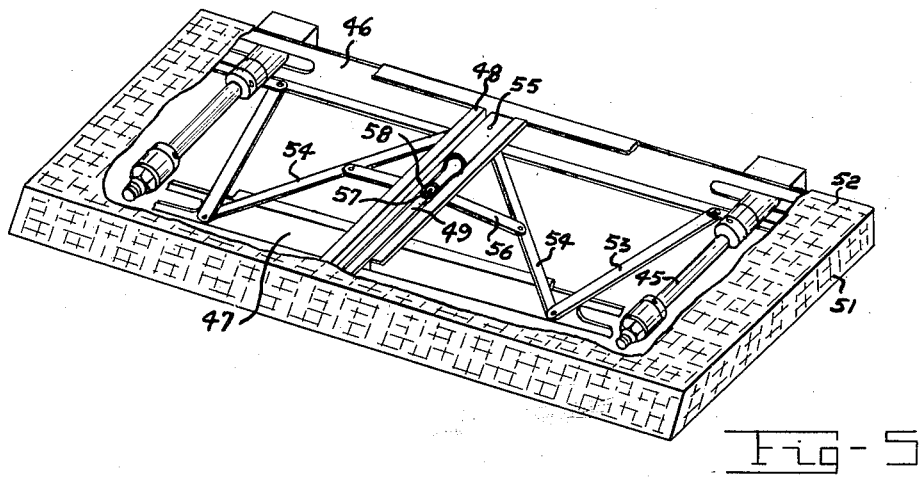

Fig. 4 is a view in perspective of the tail gate assembly, partly broken away to show the manner in which the tail gate frame is supported and centered relatively to the lift arms; and Fig. 5 is a view similar to Fig. 4, showing a modified form of tail gate assembly as particularly adapted for use in installations wherein the lift arms have a relatively long travel independently of the tail gate frame.

Like parts are indicated by similar characters of reference throughout the several views.

Referring to the drawings, a truck body 10 is mounted on a chassis, including longitudinally extending bars 11 and 12. In underlying relation to the bars 11 and 12, at the rear of the truck, is the power unit for the hoist contained in a housing 13 extending in a direction transversely of the longitudinal axis of the truck and secured to the bars 11 and 12 by U-shaped rackets 14. Within the housing 13 is suitable power initiating and transmission means, including a motor, a hydraulic pump and cylinder and a pair of shafts 15 and 16 unitarily coupled together within the housing 13 for simultaneous rocking motion in opposed senses. The shafts 15 and 16 extend in side by side relation outside the housing 13 in planes parallel to the longitudinal axis of the truck and mounted on the respective projecting ends thereof are lift arms 17 and 18. Each arm 17 and 18 is at its one end keyed or otherwise secured to the respective shafts 15 and 16 for unison rotation therewith. As a result, rocking motion of the shafts 15 and 16 as described serves to move the arms 17 and 18 corresponding extents and in a common plane at right angles to the longitudinal axis of the truck.

Figure 1:
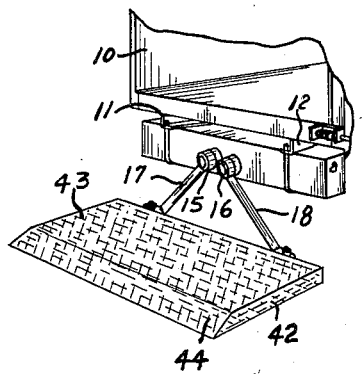
Figure 2:
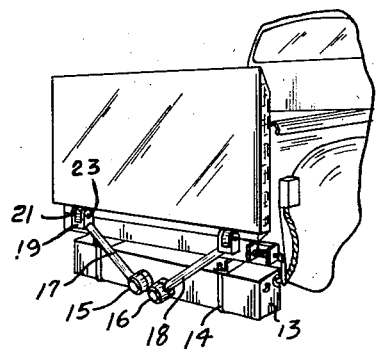
Fig. 2 is a view similar to Fig. 1, showing the tail gate elevated and rocked to an upright, closed position.

The opposite or outer free ends of the arms 17 and 18 thus describe arcs in said common plane in response to the movement of the arms. The outer end of each of the arms 17 and 18 has a yoke formation 19 receiving an angular head 21 on one end of a shaft 22. A pivot pin 23 extends through each yoke formation 19 and head 21 of a shaft 22 so as to pivotally connect the shaft 22 to its respective arm 17 or 18. Further, it will be apparent that swinging motion of the arms 17 and 18 effects a change in the ability of the shafts 22 to rock about the respective pivot pins 23 in their own vertical planes. Thus, with the parts positioned as shown in Fig. 1, wherein the arms 17 and 18 may be considered to be in a lowered position, rocking motion of the shafts 22 as described is prevented. In the elevated position of the arms, as shown in Fig. 2, however, the yoke formations 19 have in effect been rocked a distance of 90° freeing the shafts 22 for vertical rocking motion about the pins 23.

Thus, with the arms 17 and 18 in lowermost position (Fig. 1) the shafts 22 extend in parallel relation to one another and at right angles to the common plane of the arms 17 and 18. However, when the arms are in their upper position (Fig. 2) the shafts 22 are free for rotation about the pivot pins 23 and therefor the shafts 22 may be swung from their horizontal parallel position to a vertical parallel position. In such vertical position the shafts 22 are in substantially the same plane as the arms 17 and 18.

The shafts 22 provide a support for a tail gate assembly comprising essentially spaced apart frame elements 24 and 25 arranged in planes parallel to the common plane of the arms 17 and 18 and interconnected intermediate their ends by a rigid channel shaped cross member 26. Adjacent its opposite ends, the frame element 24 is formed with longitudinally elongated slots 27 while in the frame element 25 is a similar pair of slots 28, the frame elements 24 and 25 being substantially aligned with one another to align the corresponding slots 27 and 28. The shafts 22 extend through the slots 27 and 28 at respectively opposite ends of the frame elements 24 and 25. On each shaft 22, in addition to the angular head 21, is a roller 29 adapted to ride in the slot 27 and another roller 31 adapted to ride in the slot 28. The latter roller is held in place by a nut 32 threaded on to the free projecting end of the shaft 22 and by a collar 33 staked or otherwise secured to the shaft. The roller 29 is limited in its motion in one direction along the shaft 22 by the head 21. On the opposite side of the roller is a clevis member 34 rotatably mounted on the shaft and held in assembled relation to the roller 29 by a collar 35 like the collar 33 and similarly secured to the shaft 22. The assembly of parts for each shaft 22 is identical. On the clevis 34 is finger 36 to which is pivotally connected one end of a link 37, the other end of which extends toward the cross frame member 26.

There is thus provided a pair of substantially oppositely extending links 37 having their free outer ends meeting beneath the member 26. A pin 38 pivotally interconnects the described outer ends of the links 37 and further enters into and is confined within an elongated slot 39 extending longitudinally of the member 26 in the bottom thereof. A roller 41 is mounted on the pin 38 and rides in the recessed channel portion of the member 26. The links 37 are, as noted, respectively longer than the distances from the fingers 36 to the center line of the slot 39, and in conjunction with pin 38 they define a toggle connection. Lateral bodily shifting motion of the shafts 22 toward and away from one another accordingly result in a rocking motion of the links 37 and a sliding motion of the pin 38 and roller 41 in the cross member 26.

This construction and arrangement of parts stabilizes the tail gate frame relatively to the supporting shafts 22 and lift arms 17 and 18, inhibiting a relative sliding motion of the tail gate frame. This frame may further comprise, as shown, a bottom floor plate 42 and an upper tread plate 43 secured to one another and to the frame elements 24 and 25 in a suitable manner. The upper plate 43 may be formed at the front thereof with an inclined ramp 44, facilitating loading and unloading.

It will be understood that in the operation of the tail gate assembly, the arms 17 and 18 rock from the position shown in Fig. 1 to the position shown in Fig. 2 to elevate the tail gate and the load which may be supported thereon. In the course of such movement the shafts 22 slide outwardly in the slots 27 and 28 while the frame elements 24 and 25 and platform plates 42 and 43 thereon remain centered relatively to the shafts by virtue of the toggle connection afforded by the links 37 to the rigid cross member 26. The tail gate platform is at the same time lifted in a vertical sense and at the end of the lift motion occupies a position substantially level with the floor of the truck. As before noted, the shafts 22 have motion also in a rotary sense about their longitudinal axes during elevation of the arms 17 and 18 and so are positioned when fully raised to permit the tail gate to be rocked about the yoke formations 19 on the lift arms to the upright closed position of Fig. 2.

There is shown in Fig. 5 a modified form of toggle mechanism in the tail gate assembly, useful in installations wherein the amount of lateral bodily movement of the supporting shafts is greater than can be absorbed in a simple pair of links. Thus, according to the modified construction, a pair of shaft assemblies 45 identical to the shaft 22 and parts thereon extend into supporting relation to a pair of frame elements 46 and 47 which are the same as, although longer than, the corresponding elements 24 and 25 of Fig. 4. The frame elements 46 and 47 are interconnected by a rigid cross member 48 having a longitudinal slot 49 therein and the frame structure so defined is enclosed by platform plates 51 and 52. From the clevis member on each shaft assembly 45 extends a link 53 connected at its opposite end to one end of another link 54, the opposite end of which other link is connected to the corresponding end of the companion link 54 as well as being pivotally connected to the cross member 48 at a point 55. In addition, a link 56 extends from each link 54 intermediate its ends to a point underlying the cross member 48 where it is pivotally connected to a pin 57 extending upward through the slot 49 and mounting a roller 58. The toggle structure as described, it will be understood, operates substantially in the same manner as the mechanism of Fig. 4 except that a given amount of lateral motion of the shaft assemblies 45 produces a relatively smaller amount of movement of the pin 57 in the slot 49. The connections afford, as in the case of the form of Fig. 4, a stabilizing of the frame work of the tail gate assembly preventing its relative shifting motion.

When the tail gate assembly is to remain elevated it is desirable to relieve the hydraulic mechanism of the necessity of holding the parts in a raised position against the influence of the load or of gravity and operational influences.

Figure 3:
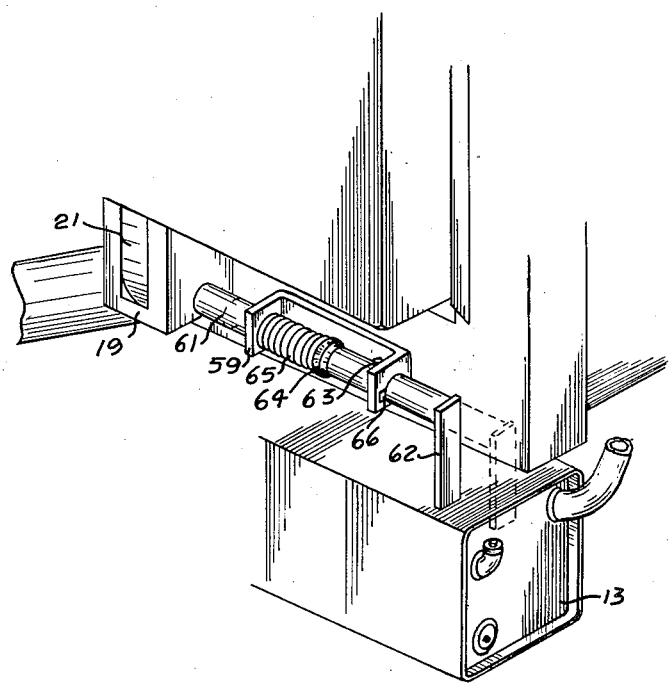
Fig. 3 is a detail view, enlarged with respect to Figs. 1 and 2, of a latch mechanism for holding the tail gate raised independently of the power means utilized to move the gate.

For this purpose, a latch is provided for either one or both of the lift arms 17 and 18. In the illustrated instance only one such latch is shown, and is seen to comprise a U-shaped bracket 59 (Fig. 3). A pin 61 is slidably mounted in the end arms of the bracket 59 and one end thereof projects into cooperative relation with the yoke formation 19 on the lift arm 18. On the opposite end of the pin 61 is a handle 62. Intermediate the ends of the pin a laterally projecting stud 63 is set therein and a collar 64 is mounted on the pin between the arms of the bracket 59, such collar confining a compression spring 65 between itself and one end of the bracket 59. In the other arm of the bracket 59 is an opening 66 of a size to permit passage of the stud 63 therethrough. With the parts positioned as shown in Fig. 3, the one end of the pin 61 is projected leftwardly toward the end of the lift arm 18 and is engageable with the arm effectively to prevent it from lowering. The latch pin is held in such projected position by the stud 63 which now is misaligned relatively to the opening 66 and limits against the one arm of the bracket 59. The spring 65 provides a force frictionally holding the stud 63 against the arm of the bracket and so inhibiting rocking motion of the latch pin to a position in which the stud might be aligned with the opening 66. To release the latch pin from its projected position, the handle 62 is grasped and the pin rocked through about 90° of movement to align the stud 63 with the opening 66 whereupon the spring 65 is released to move the latch pin rightwardly or in a direction to remove the one end thereof from cooperative relationship with the lift arm 18. The spring 65 then provides a yielding force holding the latch pin out of the path of motion of the lift arm during subsequent raising and lowering motions thereof. The latch mechanism is restored to effective position, of course, by an opposite motion of the pin 61, that is, by shifting the pin axially leftward until the stud 63 has passed through the opening 66 and then turning the pin about its axis until the parts are positioned substantially as indicated in Fig. 3 in full lines.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A tail gate hoist, including a pair of arms coupled for unitary swinging movement in opposite directions in a common plane, said arms having free outer ends describing arcs in said plane in response to movement of said arms, a shaft pivotally connected to the outer end of each arm and extendable in a plane normal to said common plane, a tail gate comprising a pair of spaced apart frame elements supported by said shafts, spacer means maintaining the spaced apart relation of said frame elements and providing spaced bearings for said shafts, a cross member extending between and interconnecting said spacer means at about their mid points, said cross member being fixed parallel to and between said shafts, said cross member having a longitudinal slot therein, a pin slidable in said slot, and toggle linkage interconnecting said shafts and pivotally connected to said pin and utilizing said pin as a reactant member inhibiting lateral shifting motions of the tail gate.

2. A tail gate hoist according to claim 1, characterized in that said toggle linkage comprises oppositely extending links each pivotally connected at one end to a respective shaft for rotation thereof relative thereto and pivotally connected at its other end to said pin.

3. A tail gate hoist according to claim 1, characterized in that said toggle linkage comprises oppositely extending links each pivotally connected at one end to a respective shaft and for rotation of said shaft relative thereto and further comprising intermediate links pivotally connected at their one ends to one another and to said cross-member and at their other ends to respective other ends of the first said links, and a brace between said intermediate links connected to said pin.

4. A tail gate hoist, including a pair of arms, coupled for unitary swinging movement in opposite directions in a common plane, said arms having free outer ends describing arcs in said plane in response to movement of said arms, a shaft pivotally connected to the outer end of each arm and extendable in a plane normal to said common plane, a tail gate comprising a pair of spaced apart frame elements in respective planes parallel to said common plane, each of said elements having longitudinally spaced apart longitudinally elongated slots, said elements being substantially aligned with aligned slots receiving respective shafts, toggle linkage interconnecting said shafts between said frame elements for balanced rotatable movement of said shafts to and from each other in the plane normal to the common plane, a cross member extending in a direction parallel to and between said shafts and secured at its opposite ends to said frame elements, said cross member being formed with a longitudinally extending slot, and a pin slidable in said member and connected in said toggle linkage in pivotal relation to oppositely extending balancing links thereof.

5. A tail gate hoist, including a pair of arms coupled for unitary swinging movement in opposite directions in a common plane, said arms having free outer ends describing arcs in said plane in response to movement of said arms, a yoke formation at the outer end of each arm, a pair of shafts movable into a normal position relative to said common plane and received in respective yoke formations, a pivot pin mounted in each yoke formation to which said shafts are rotatably connected, a pair of spaced apart frame elements in respective planes parallel to said common plane and having aligned longitudinally elongated slots receiving said shafts, a sleeve rotatably mounted on each of said shafts between said frame elements, links having their one ends pivotally connected to respective sleeves and having their other ends terminating between said shafts, a cross member extending in a direction parallel to and between said shafts and secured at its opposite ends to said frame elements, said cross member being formed with an elongated slot parallel to said shafts, and a toggle connection between the said other ends of said links including a pin slidably mounted in said elongated slot.

6. A tail gate hoist according to claim 5, characterized by latch means adjustable to hold said arms in a set position of arcuate adjustment.

7. A tail gate hoist for trucks, including a pair of arms coupled for unitary swinging movement in opposite directions in a common plane, said arms having free outer ends describing arcs in said plane in response to movement of said arms, a tail gate supported by said arms at their outer ends, a power unit for operation of said arms, said unit including a truck mounted housing and a pair of parallel shafts projecting outside said housing, the opposite ends of said arms being secured to projecting ends of said shafts, and truck mounted latch means selectively engageable with one of said arms to hold said arms in a set position of adjustment, said latch means comprising a relatively stationary bracket, a plunger movable in said bracket to a position blocking movement of said one arm in one direction, a spring urging said plunger out of said position, and interlocking means between said plunger and said bracket selectively engageable to hold said plunger in said position.

References Cited in the file of this patent

UNITED STATES PATENTS

| | | |
|---|---|---|
| 892,413 | Freeman | July 7, 1908 |
| 1,182,110 | Sinkler | May 9, 1916 |
| 2,698,103 | Rostine | Dec. 28, 1954 |
| 2,701,656 | French | Feb. 8, 1955 |
| 2,706,565 | Krasno | Apr. 19, 1955 |